United States Patent [19]
Goldstein

[11] 3,820,918
[45] June 28, 1974

[54] SUPERSONIC FAN BLADING

[75] Inventor: Arthur W. Goldstein, Shaker Heights, Ohio

[73] Assignee: The United States of America as represented by the Administrator of the National Aeronautics and Space Administration, Washington, D.C.

[22] Filed: Jan. 21, 1972

[21] Appl. No.: 219,806

[52] U.S. Cl.................. 416/223, 416/237, 415/181
[51] Int. Cl............................................. F01d 5/14
[58] Field of Search............ 416/223, 237; 415/181

[56] References Cited
UNITED STATES PATENTS

| 2,435,236 | 2/1948 | Redding | 415/181 |
| 2,659,528 | 11/1953 | Price | 416/237 UX |
| 2,934,259 | 4/1960 | Hausmann | 415/181 |
| 2,974,927 | 3/1961 | Johnson | 415/181 |
| 3,059,834 | 10/1962 | Hausammann | 415/181 UX |

FOREIGN PATENTS OR APPLICATIONS

| 306,642 | 7/1918 | Germany | 415/181 |
| 1,053,713 | 3/1959 | Germany | 415/181 |
| 459,043 | 8/1950 | Italy | 415/181 |
| 1,313,886 | 11/1962 | France | 415/181 |
| 315,185 | 9/1956 | Switzerland | 415/181 |

Primary Examiner—Everette A. Powell, Jr.
Attorney, Agent, or Firm—N. T. Musial; J. A. Mackin; J. R. Manning

[57] ABSTRACT

Radially extending rotor blades are disposed on a hub to form a supersonic propulsion fan for a turbofan engine. The peripheral spacing of the blades is such as to avoid forming a channel or passageway between adjacent blades. Each blade has a flat trailing surface extending from the leading edge at least as far to the rear as to cause any pressure waves which might originate on the blade surface to strike the leading surface of the following blade rather than propagate upstream of the blade row. The flat trailing surface of each blade makes an angle with the axis of rotation such that the blade is parallel to a gas inflow into the blades.

2 Claims, 2 Drawing Figures

PATENTED JUN 28 1974  3,820,918

SUPERSONIC FAN BLADING

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates to rotor blades for turbomachinery and is directed more particularly to a fan suitable for use in a turbofan engine of jet aircraft.

In recent years, because of increased air traffic and the increase of size of jet propulsion engines for aircraft, the elimination or reduction of aircraft engine noise has become an important goal. Because the propulsion fans of the type which operate at subsonic speed require low-speed, high-torque driving turbines which must be relatively heavy, a great many turbofan aircraft engines utilize transonic fans. A transonic fan is one in which the blade roots move at a subsonic velocity while the blade tips travel at supersonic speed. Transonic fans radiate more noise forward out the front of the engine air inlet than subsonic fans. These noises may be reduced by sound absorbing structures placed in an aircraft engine air inlet upstream of the rotor. However, in addition to adding extra weight to the engine, such structures create disturbances in the airflow into the rotor blades of the fan. These disturbances cause the rotor to emit new noises which are of a type which propagate well out of the front of the engine air inlet. Thus, a desirable propulsion fan for a turbofan engine is one which would emit a minimum of noise frequencies of the type which tend to propagate out the front of an engine air inlet. Although such a propulsion fan may increase the noise frequencies propagated in a downstream direction, this is not objectionable because a distribution of noise in a rearward direction is more easily controlled than one in a forward direction.

OBJECTS AND SUMMARY OF THE INVENTION

It is an object of the invention to provide for a turbofan engine a propulsion fan which propagates a minimum noise distribution in a forward direction.

It is another object of the invention to provide a transonic propulsion fan which eliminates choking in the inner-blade channels or spaces of the rotor.

Still another object of the invention is to provide a transonic propulsion fan utilizing a rotor blade profile and configuration which causes oblique shocks to attach to the leading edge of each blade rather than producing a normal shock in front of the inner blade channels.

It is a further object of the invention to provide a propulsion fan in which the trailing surfaces of the rotor blade are substantially parallel to the direction of gas inflow into the blades at all cylindrical sections for the same inflow conditions.

In summary, the instant invention provides for a turbofan engine, a propulsion fan having blades traveling at supersonic speed with propagation of pressure waves downstream only in flow with a subsonic axial flow component. The propulsion fan causes allocation of compression shock between the upstream branch and the downstream branch of an oblique bow wave emanating from the leading edge of each blade so that the upstream branch has zero strength while the downstream branch produces the entire deflection of an incoming gas through the angle required by the blade wedge angle.

DESCRIPTION OF A PREFERRED EMBODIMENT

It will be understood that in the fan the blade profile will vary from one part of the blade span to another.

Discussed is a particular blade section where the relative gas velocity is 1.3 times sonic speed. Furthermore, the description is simplified to be appropriate to the sections as they appear on the flat drawing. It should be understood that they are to be reinterpreted in order to be appropriate for blade sections disposed around an axis.

Figure 1:
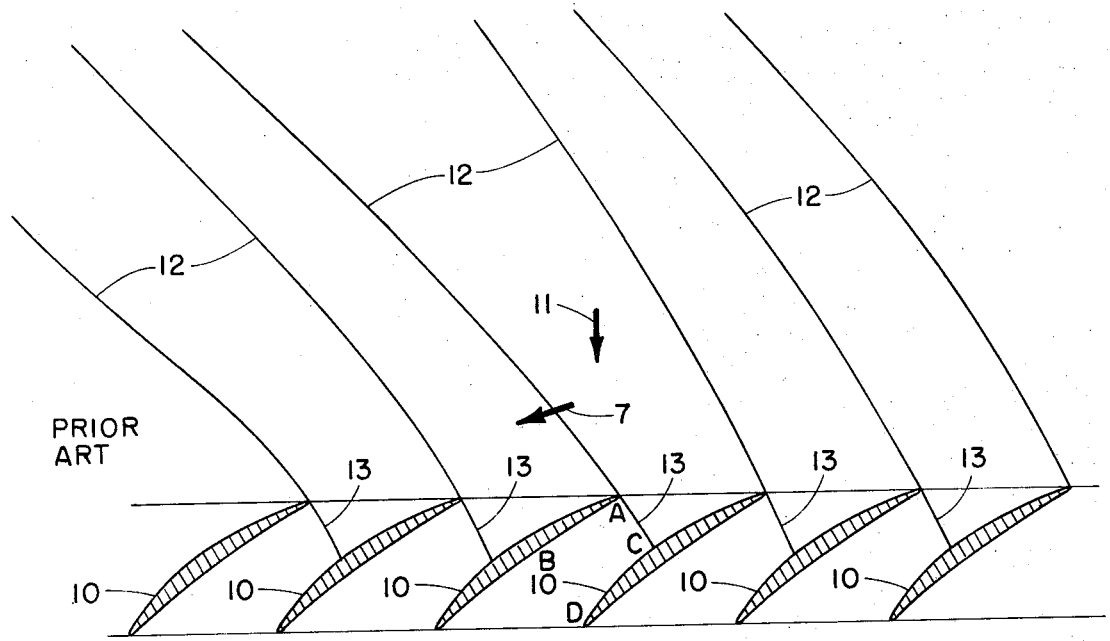

Referring to FIG. 1, there is shown a row of conventional turbomachinery rotor blades 10 rotating in the direction of arrow 6. Air or gas flow toward the blades is indicated by the arrow 11 while arrow 7 shows the relative direction of gas inflow into the blades. When these blades operate at supersonic speeds, shock waves develop causing noise to be propagated toward the front of the turbomachine. These shock waves comprise oblique shocks indicated at 12 and normal shock waves as identified by numerals 13.

Figure 2:
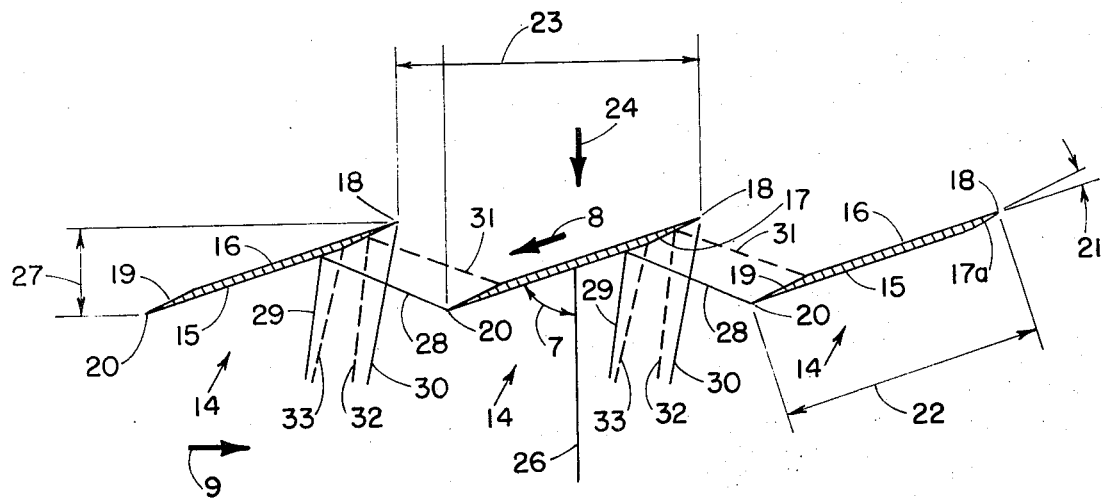

Referring now to FIG. 2 there is shown three rotor blades 14 of a row of blades disposed around a hub and extending radially therefrom to form a fan suitable for use with a turbofan engine. Each of the blades 14 includes a forward or a pressure surface 15 and a trailing or suction surface with a flat portion 16. A first surface 17 extends between a leading edge 18 of the blade 14 and the leading surface 15. Likewise a second surface 19 extends from the trailing surface 16 to a trailing edge 20 of the blade 14. This surface 19 serves to terminate the blade section and may be a portion of the leading surface. The surface 17 makes a wedge angle 21 with the trailing surface 16 sufficiently samll to permit the formation of an attached bow wave, but sufficiently large to be structurally sound. The aerodynamic condition for the wedge angle may be found in textbooks on supersonic flows. A mechanically sound angle has a minimum value between 6° and 12°. As shown, the sloping surfaces 17 extend from leading edges 18 to merge with the leading surfaces 15 and may be flat, as shown, or curved. The sloping surface 19 may be eliminated by curving the rearward portion of surface 15 to intersect surface 16. The trailing surfaces 16 are preferably parallel to the inflow direction of the gas which is indicated by arrow 8. The leading surfaces are at an angle 7 to axis 26 of the fan as will be known to those skilled in the art.

As mentioned previously, a fan built in accordance with the invention is a low density type. That is, the peripheral spacing 23 of the blades 14 is such that there is no confining flow channel formed between adjacent blades as there is indicated in FIG. 1, letters AB and CD. The distance from the trailing edge 20 of each blade to the leading edge 18 as measured along a line parallel with the axis 26 defines a rotor region 27. Arrow 9 indicates the direction of rotation of the blades 14.

When the blades 14 are traveling at supersonic speed, a compression wave 28 is generated at the trailing edge 20 of each blade and is reflected by the following blade as indicated at 29. A bow wave 30 emanates downstream from the leading edge 18 of each blade. An expansion wave 31 is also generated at the beginning of the trailing slope 19 in the particular embodiment of FIG. 2 and is reflected as a component 32 from the following blade. An expansion wave 33 is reflected downstream from the forward surface of each of the blades 14.

With a particular blade configuration and arrangement comprising the invention, substantially all noise-making shock waves are reflected downstream thereby minimizing the amount of noise that emanates from the front of a turbofan engine embodying the invention.

It will be understood that changes and modifications to the invention described herein may be made by those skilled in the art to which the invention pertains without departing from the spirit and scope of the invention as set forth in the claims appended hereto.

What is claimed is:
1. A turbofan comprising:
a plurality of blades extending radially from a hub, each blade, for any portion thereof traveling more than 1.3 times sonic speed, having a trailing surface flat over a sufficient length that any pressure wave emanating there shall be intercepted by the following blade and reflected downstream of the rotor, a leading edge wedge having an angle sufficiently small to permit attached bow waves, said leading edge wedge having a curved surface, a trailing edge wedge, and sufficiently large blade spacing relative to the blade chord to avoid interblade flow channels and choking flow, said blade being of constant thickness between said wedges.

2. The structure of claim 1 wherein the leading edge wedge angle is between about 6° to 12°.

* * * * *